Sept. 25, 1923.
H. C. F. ZIMMER
BOX COVER
Filed Oct. 27, 1922
1,468,852
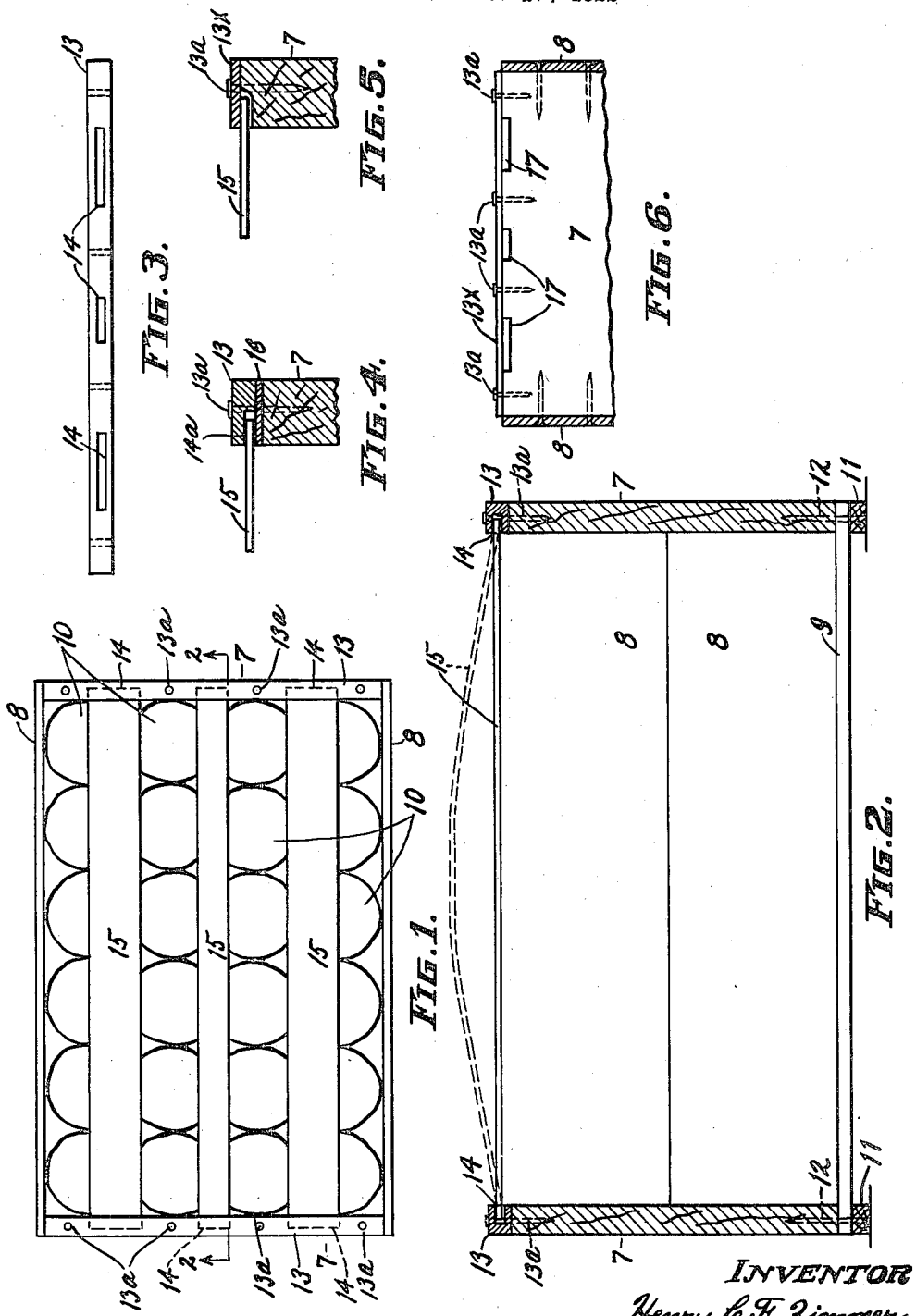
INVENTOR
Henry C. F. Zimmer.
BY A. M. Carlsen.
ATTORNEY.

Patented Sept. 25, 1923.

1,468,852

UNITED STATES PATENT OFFICE.

HENRY C. F. ZIMMER, OF ST. PAUL, MINNESOTA.

BOX COVER.

Application filed October 27, 1922. Serial No. 597,278.

*To all whom it may concern:*

Be it known that I, HENRY C. F. ZIMMER, a citizen of the United States, residing at St. Paul, in the county of Ramsey and State of Minnesota, have invented certain new and useful Improvements in Box Covers, of which the following is a specification.

My invention relates in general to containers for shipping and displaying of fruit and more particularly to the cover construction of boxes commonly used for displaying apples and other fruit.

The object is to provide a simple and efficient box of such construction as to make its contents easily accessible without the use of tools and eliminating the need of breaking open the top of the box which causes a loss of time as well as loss in breakage of parts and damage to the contents.

In the accompanying drawing;

Fig. 1 is a top view of a fruit box embodying my improvements.

Fig. 2 is an enlarged sectional view as on line 2—2 in Fig. 1.

Fig. 3 is an enlarged edge view of the bar 13 in Fig. 1.

Fig. 4 is an enlarged, modified detail of the upper right hand portion of Fig. 2.

Fig. 5 is a modification of Fig. 4.

Fig. 6 is an inside elevation of the upper portion of one end of a fruit box embodying the modified construction partly shown in Fig. 5.

Referring to the drawing by reference numerals 7 designates the end walls, 8 the sides and 9 the bottom of the usual type of box used for shipping fruit such as apples 10, all of said sides being made of any suitable wood but the end walls 7 being thicker than the other sides. 11 are cross cleats commonly used to secure the top and bottom boards to the end walls by nails 12, but illustrated at the bottom only in Fig. 2.

My improvement displaces the usual bottom and top construction and may, of course, be used in the top only or bottom and top, as desired. It consists of two bars, 13, rectangular in cross section, preferably made of metal and of a length corresponding to the width of the box, each bar having perforations in which nails 13ᵃ are inserted and driven into the end walls 7. Each bar has its inwardly disposed edge provided with a predetermined number of elongated pockets or mortises 14, spaced so that they correspond in longitudinal direction of the box. For each pair of oppositely disposed pockets I provide a bar 15, preferably of so-called flat steel, adapted to be inserted in said pockets and of such length that they cannot be inserted or removed except by bending the bar about as shown dotted in Fig. 2, thus shortening the distance between the ends and permitting removal or insertion of the ends in the opposite pockets.

The bars may vary in number, thickness and width but are preferably spaced about as shown in Fig. 1, the contents of the box being securely held yet partially exposed to view. A merchant can thus use the box as a display and if it is desired to get a sample of the contents or take out part or all of the contents he merely removes one or more of the flat bars 15 as described. After removing all of the contents the bars 15 may be replaced and the box is in serviceable condition for further use.

In the modified form illustrated in Fig. 4, I provide the bar 13 with a series of downwardly and inwardly opening notches 14ᵃ and a plain metallic strip 16, below it, having perforations registering with those in bar 13 permitting the two bars to be nailed on the top edge of the end board 7 and providing pockets into which the bars 15 may be inserted.

In Figs. 5 and 6 a plain bar 13ˣ is nailed to the upper edge of each end wall and rearwardly and upwardly opening notches 17 are cut in the upper edge of each end board and into which the bars 15 are inserted as in the preferred form above described.

What I claim is;

The combination with a box having near its top a series of horizontally aligned, oppositely arranged, individual pockets in two opposite walls, of a cover consisting of a series of separate and spaced parallel boards, each of said boards being resilient enough to be arched upward while its opposite ends are inserted first one and then the other into two of said opposite pockets.

In testimony whereof I affix my signature.

HENRY C. F. ZIMMER.